United States Patent [19]

Miura et al.

[11] Patent Number: 4,773,089

[45] Date of Patent: Sep. 20, 1988

[54] TELEPHONE LINE-SWITCHING DEVICE

[75] Inventors: Teiichi Miura; Toshihisa Hirata; Kengo Shibuya; Akira Niinuma; Hidenori Nagai, all of Furukawa, Japan

[73] Assignee: Alps Electric Co., Ltd., Japan

[21] Appl. No.: 945,668

[22] Filed: Dec. 23, 1986

[30] Foreign Application Priority Data

Feb. 7, 1986 [JP] Japan .............................. 61-15758[U]

[51] Int. Cl.[4] ........................ H01H 1/36; H01H 9/26; H04M 1/72

[52] U.S. Cl. .................................... 379/423; 200/5 C; 200/5 D; 379/212

[58] Field of Search ............... 379/423, 422, 212, 157; 200/5 B, 5 C, 5 D, 5 E

[56] References Cited

U.S. PATENT DOCUMENTS

| | | | |
|---|---|---|---|
| 634,575 | 10/1899 | Ham | 379/423 |
| 982,213 | 1/1911 | Koltonski | 379/423 |
| 1,479,586 | 1/1924 | Currier | 379/423 |

*Primary Examiner*—Thomas W. Brown
*Attorney, Agent, or Firm*—Guy W. Shoup; Paul J. Winters

[57] ABSTRACT

A telephone line-switching device comprises first and second switches that interlock and a lock plate extending between the two switches. The push member of the first switch has a cam with which the lock plate usually engages. The push member of the second switch has an inclined portion on which the lock plate always bears. As the push member of the second switch is depressed, the inclined portion horizontally moves the lock plate, permitting the lock plate to disengage from the cam to release the first switch.

1 Claim, 3 Drawing Sheets

TELEPHONE LINE-SWITCHING DEVICE

FIELD OF THE INVENTION

The present invention relates to a switch device comprising two interlocking switches, one of which cannot be locked, the other being lockable. More specifically, the invention relates to a switch device adapted to a switch of a telephone line from one telephone set to another.

BACKGROUND OF THE INVENTION

A conventional switch device of this type is shown in FIG. 4, and comprises a switch 10 having a lock mechanism and a second switch 20 acting to unlock the switch 10. When the push member of the switch 10 is depressed to a certain depth, one contact is switched to another. Simultaneously, the switch 10 is locked. Once the switch 10 has been locked, the push member is maintained locked in the depressed position even if the depressing force is no longer applied to the switch 10. With respect to the switch 20, when the push member is depressed, one contact is switched to another. When the push member of the switch 20 is pushed and released to its original height, the switch 20 unlocks the switch 10 from its depressed position.

The switch 10 comprises the push member, indicated by numeral 11, a cam 12 formed on a part of the push member 11, a common terminal 13, switched terminals 14, 15, and a clip 16 that moves between the terminals 14 and 15 and acts as a movable contact. The push member 11 is mounted in a chassis 40 such that the cam 12 and the clip 16 can move a distance corresponding to the amount of depression. The clip 16 serves in such a way that when the member 11 is not depressed, the common terminal 13 is connected with the terminal 14, while when the member is depressed, the common terminal 13 is connected with the terminal 15.

The switch 20 comprises the push member, indicated by numeral 21, a heart cam 22 formed at an intermediate location on a lower part of the member 21, a reset pin 23, a retainer 24 that holds the pin 23, a common terminal 25, switched terminals 26, 27, a clip 28, and a coiled spring 29 for biasing the push member 21 back to its original position. The member 21 moves the cam 22 and the clip 28 simultaneously so that the reset pin 23 may move in a circular path within the cam 22. Also, the member 21 connects the common contact 25 with the terminal 26 or 27. A knob (not shown) is installed on the top of the push member 21. Both ends of the pin 23 are bent at right angles toward the push member 21. One of these ends is fixed to the retainer 24, which is affixed to the chassis 40. The other end is rotatably placed in the path of the cam 22.

A lock plate 41 is disposed between the switches 10 and 20, and has U-shaped cutouts located below the push members 11 and 21. The cutouts engage the surface of the cam 12 and the surface of the pin 23, respectively. The lock plate 41 is biased to the left as viewed in the figure by a spring 42. The operation of the conventional switch device constructed as described above is described below by referring to FIGS. 4–6.

FIG. 4 shows the condition in which the push member 11 of the switch 10 is depressed, so that the switch is locked in the depressed position. The push member 21 of the switch 20 is not operated. Under this condition, if the push member 21 of the switch 20 is depressed, the heart cam 22 is lowered as shown in FIG. 5. Thus, the lower end of the reset pin 23 is located near the top of the cam 22. Also, the clip 28 connects the common terminal 25 with the terminal 27.

Where the switch device is used for a telephone set, when an external call is received, the switch 10 is depressed. Then, if this call is to be transferred to another interphone, the push member of the switch 20 is depressed to suspend the call. Then, the finger is moved away from the push member 21 of the switch 20 and, at the same time, the switch 10 is unlocked from the depressed position. Then, the switch 20 is returned to its original state. In this way, this telephone set is disconnected from the telephone circuit. FIG. 4 shows the condition in which this telephone set is connected with the external line. FIG. 5 shows the condition in which the external call is suspended.

Under the condition shown in FIG. 5, if the operated member 21 ceases to be depressed, the heart cam 22 and the clip 28 move up together with the operated member 21 as shown in FIG. 6. During this process, the pin 23 drops into the right recess in the cam 22 from the top end, permitting the pin 23 to rotate to the right. Then, the lock plate 41 shifts to the right against the biasing force of the spring 42. As a result, the cutout moves away from the cam 12. Thus, the push member 11 is unlocked. Then, the member 11 is allowed to be moved upward by a spring (not shown) mounted on the member 11. Concurrently, the clip 16 is elevated with the result that the contact 14 is connected with the common contact 13. Under this condition, the telephone set equipped with this switch device is disconnected from the telephone circuit. In the conventional telephone line-switching device designed as described above, the switch 10 cannot be unlocked before the switch 10 is operated to perform a switching operation. For this purpose, the structure of the switch device is made complex. More specifically, the cam 12, the heart cam 22, the reset pin 23, etc. are required to be provided to permit the plural switches to interlock.

SUMMARY OF THE INVENTION

In view of the foregoing problem with the prior art device, it is the object of the present invention to provide a telephone line-switching device which is simple in structure but is able to perform switching operation at appropriate timing.

The above object is achieved by a telephone line-switching device having a first switch that is locked by being depressed and is maintained locked in the depressed position thereafter and a second switch from the depressed position that performs a switching operation when depressed and then moves a lock plate to unlock the first switch, said switching device comprising: a cam formed on the operated member of the first switch; and an inclined portion formed on the operated member of the second switch at the side of the lock plate; the end of the lock plate which is in engagement with the cam being disengaged from the cam when the push member of the second switch is moved while shifting the inclined portion.

In the novel switch device constructed as described above, as the second switch is depressed, the lock plate moves at right angles to the direction in which the push member is shifted. Then, the cam of the first switch disengages from the lock plate. Thus, a line-switching device can be designed without the need to employ a heart cam and the associated components.

DETAILED DESCRIPTION OF THE INVENTION

Figure 1:
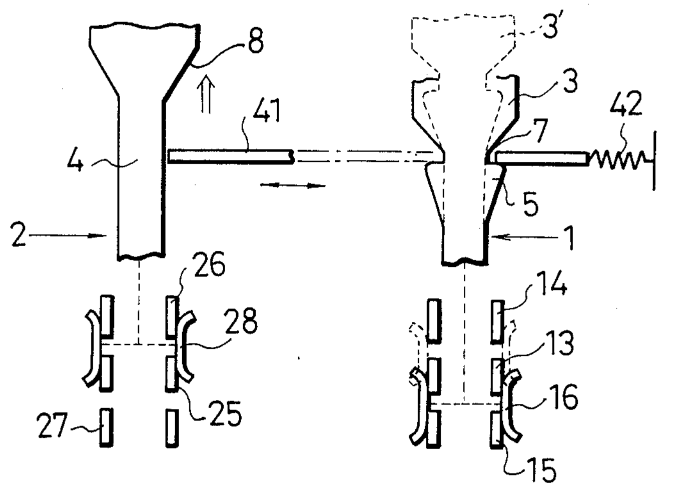
FIGS. 1–3 are plan views of a switching device according to the invention, for showing different conditions of the device.
Figure 4:
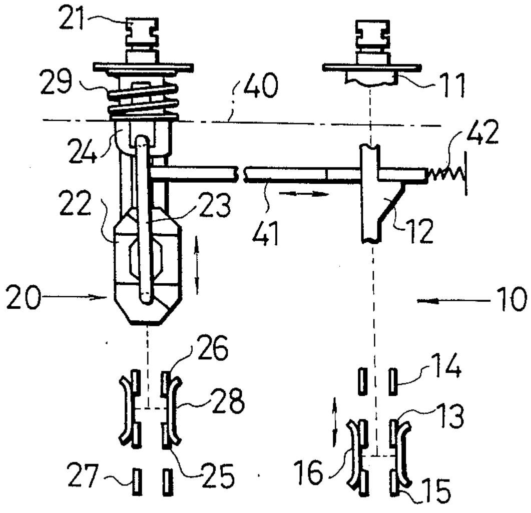
Fig. 4 PRIOR ART
FIG. 4 is a plan view of a conventional telephone line-switching device.
Figure 5:
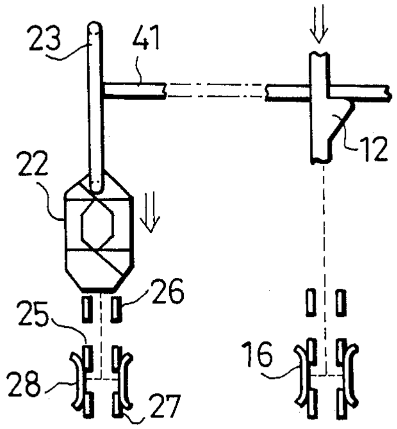
Fig.5 PRIOR ART
FIGS. 5 and 6 are schematic plan views of the device shown in FIG. 4, for showing different conditions of the device.
Figure 6:
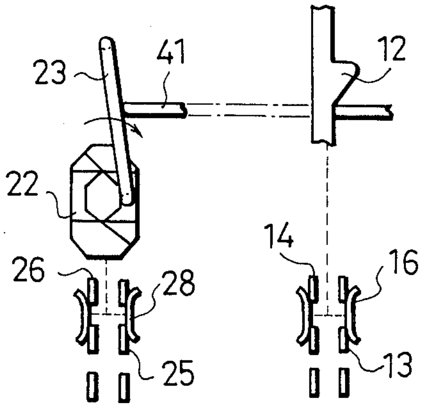
Fig.6 PRIOR ART

Referring to FIG. 1, there is shown a telephone line-switching device according to the invention. It is to be noted that like components are denoted by like reference numerals throughout all the figures. The switch device shown in FIG. 1 comprises key switches 1 and 2. When the push member 3 of the switch 1 is depressed, one contact is switched to another. Once this push member 3 is depressed, the contact remains connected with the common contact even if the push member is returned to its original height. While the push member 4 of the switch 2 is being depressed, one contact is switched to another. If this push member 4 is then depressed further, the switch 2 unlocks the switch 1 from the depressed position. The switches 1 and 2 have heads (not shown) that are similar in shape to the heads shown in FIG. 4. These heads of the switches 1 and 2 are designed to be capable of moving clips 16 and 28, respectively.

A wedge-shaped cam 5 is formed on a portion of the push member 3 of the key switch 1. As the push member 3 is depressed, the inclined surface of the cam 5 horizontally moves the lock plate 41 against the action of the spring 42 until the plate 41 fits into a recess 7 formed in the waist of the cam 5. Then, the enlarged portion of the cam 5 is pressed against the plate 41, thus preventing the operated member 3 from returning to its original position. In this way, the push member 3 is locked.

A portion of the push member 4 of the key switch 2 decreases in diameter downwardly to form an inclined surface 8 at the side of the lock plate 41. Either one end of the plate 41 or the inner wall of a recess formed at an intermediate position in the plate 41 invariably bears on the inclined surface 8. Accordingly, as the inclined surface 8 is shifted, the plate 41 is horizontally moved.

The operation of the switch device constructed as described above is now described by referring to FIGS. 1–3. When the device is not operated, the push member 3 assumes position 3′ indicated by the broken line in FIG. 1. Also, the push member 8 takes the position shown in FIG. 1. Under this condition, if the push member 3′ of the switch 1 is depressed to lift the telephone set and to connect it with the outside line, the push member moves to the position 3 indicated by the solid line. At the same time, the clip 16 moves from the position indicated by the broken line to the position indicated by the solid line. Also, the end of the lock plate 41 that was in contact with the push member 3 rides over the cam 5 and fits into the recess 7, locking the push member 3 in the depressed position. This connects the telephone set having the switch device with the outside line, permitting the user to have a conversation over the telephone. Under this state, the key switch 2 is not operated.

When the outside line is switched to another telephone set, the push member 4 of the key switch 2 that is a suspension key is depressed. The process of this depression is described now by referring to FIG. 2. As the member 4 is pushed down, the clip 28 begins to move, connecting the common contact 25 with the terminal 27. At this time, the lock plate 41 is not shifted, but is located at the lower end of the inclined surface 8 and ready to be driven.

Figure 2:
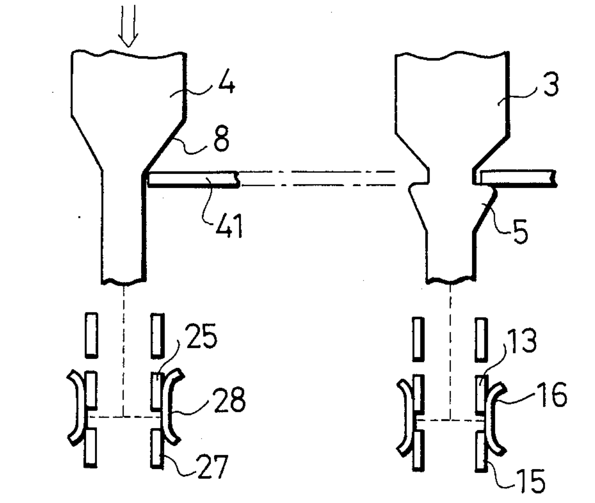
Figure 3:
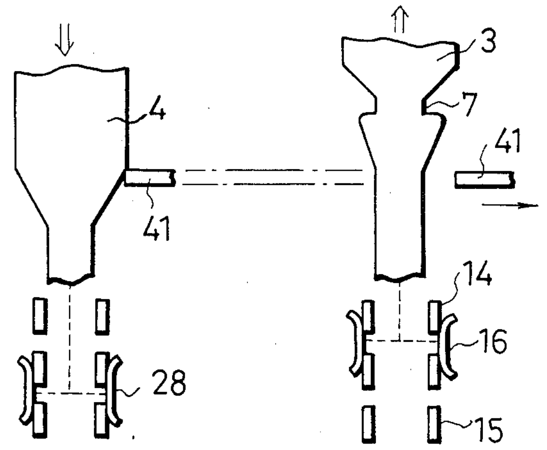

Under the condition shown in FIG. 2, if the push member 4 is depressed, then the condition shown in FIG. 3 is created. In this state, the lock plate 41 horizontally moves while being pressed against the inclined surface 8 until the upper end of the inclined surface 8 reaches the plate 41, whereupon the plate 41 moves away from the recess 7 in the operated member 3. This unlocks the push member 3, so that it is returned to its original position by the action of the spring (not shown) mounted on the member 3. At the same time, the clip 16 is driven to interconnect the terminals 13 and 14. After checking this condition, the finger is released from the operated member 4. Then, the member 4 is elevated to its original position shown in FIG. 1 by the action of the spring (not shown) mounted on the member 4.

As described thus far, the lock plate 41 engages the cam 5, locking the switch 1 in the depressed position. The switch 1 can be unlocked by allowing the lock plate 41 to move horizontally along the inclined portion formed on the switch 2 that is not equipped with a locking mechanism such as a heart cam. Thus, a simple, small-sized, telephone line-switching device that is made up of a small number of components can be constructed.

What is claimed is:

1. A telephone line-switching device comprising:

a first switch and a second switch arranged horizontally spaced from each other in tandem, said first switch having a first push member, a cam with a lockable cam surface on an intermediate part thereof and a first movable contact attached to a lower part thereof, and said second switch having a second push member, an inclined surface on an intermediate part thereof and a second movable contact attached to a lower part thereof;

a horizontally slidable plate having a first recess part bearing against said lockable cam surface of said first push member and a second recess part bearing against said inclined surface of said second push member, and biasing means for biasing said plate to bear against said surfaces of said first and second push members, said first push member and said second push member each being independently depressable from an undepressed position downward to a depressed position, wherein when said first push member is depressed to the depressed position, said cam surface becomes locked by engagement with said first recess part of said plate, and said first push member is unlocked from said depressed position to return to said undepressed position when said plate is displaced horizontally from engagement with said cam surface;

first switch contacts, provided below said first push member, including a first common contact and a pair of first fixed contacts each on a respective upper and lower side of said first common contact, wherein when said first push member is in the undepressed position, said first movable contact is in an upper switch contact position bridging said upper first fixed contact and first common contact, and when said first push member is depressed to the depressed position, said first movable contact slides to a lower switch contact position bridging said lower first fixed contact and first common contact; and second switch contacts, provided below said second push member, including a second common contact and a pair of second fixed contacts each on a respective upper and lower side of said second common contact, wherein when said second push member is in the undepressed position, said second movable contact is in an upper switch contact position bridging said upper second fixed contact and second common contact, and when said second push member is depressed to the depressed position, said second movable contact slides to a lower switch contact position bridging said lower second fixed contact and second common contact, wherein said inclined surface of said second push member is formed with a downwardly narrowing shape from an upper portion to a lower portion thereof, said second push member being depressable from an undepressed position, in which said second recess part of said slidable plate bears against the lower portion of said inclined surface, to a depressed position, in which said second recess part of said slidable plate slides along said inclined surface to the upper portion thereof and is horizontally displaced thereby, so as to unlock said first push member from the depressed position and changeover said first movable contact thereof from the lower switch contact position to the upper switch contact position at the same time said second movable contact of said second push member slides to the lower switch contact position.

* * * * *